UNITED STATES PATENT OFFICE.

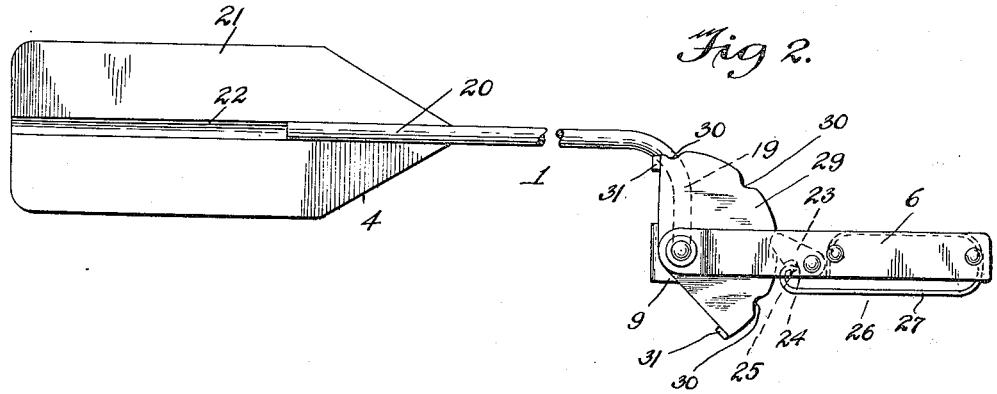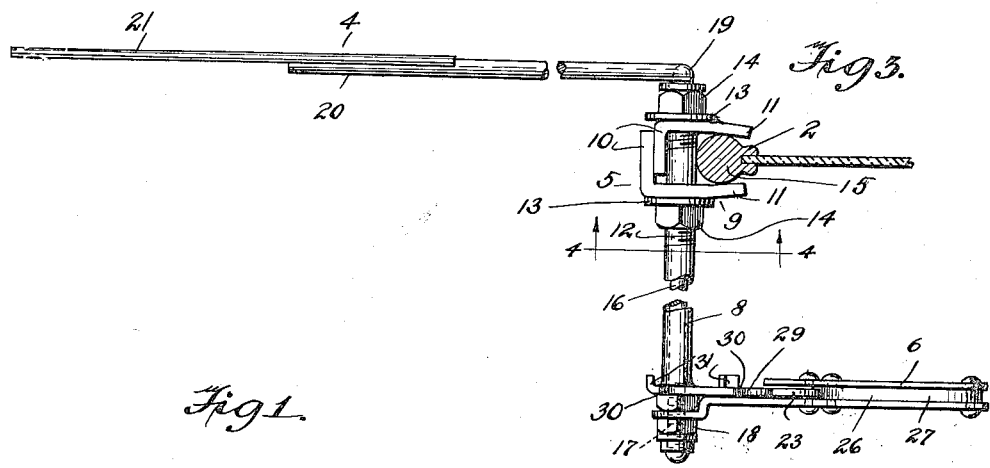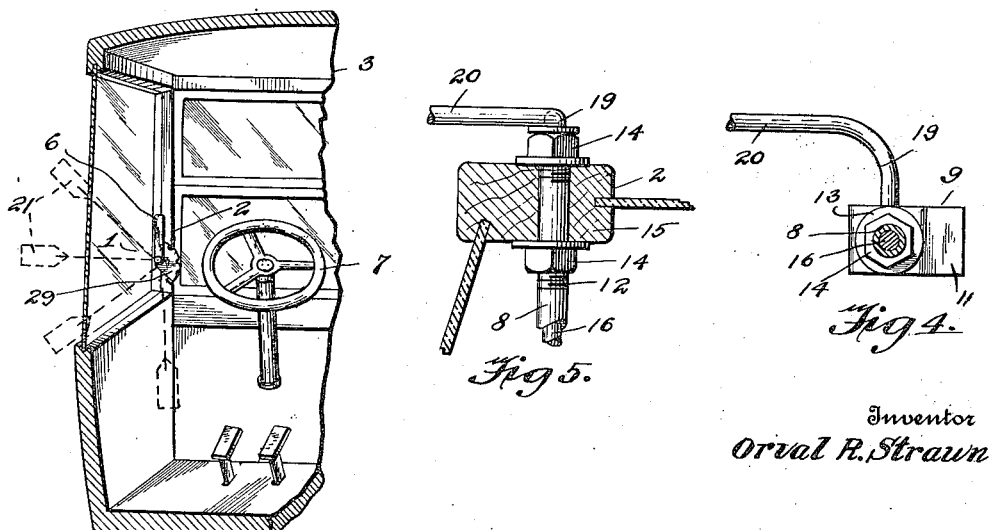

ORVAL R. STRAWN, OF COLUMBUS, OHIO.

VEHICLE SIGNAL DEVICE.

1,426,017.  Specification of Letters Patent.  Patented Aug. 15, 1922.

Application filed February 23, 1921. Serial No. 447,090.

*To all whom it may concern:*

Be it known that ORVAL R. STRAWN, a citizen of the United States, residing at Columbus, in the county of Franklin and State of Ohio, has invented certain new and useful Improvements in Vehicle Signal Devices, of which the following is a specification.

This invention relates to an improved direction signal for motor vehicles, and has for its object to provide a signal of this character which will be of simple and efficient construction and capable of being easily and positively actuated so as to provide a signal for indicating various intended movements to be made on the part of the vehicle equipped therewith, in order that drivers of adjacent vehicles or pedestrians may be clearly notified as to the intended movements of the vehicle.

In carrying out the invention, there is employed a signal which is adapted to be mounted in connection with the wind shield structure of a vehicle and includes a rotatably journaled arm carrying an exteriorly located signalling blade and an interiorly located crank arm, the said crank arm being disposed adjacent to the steering wheel of the vehicle in order to be readily accessible, the said crank arm being provided with a spring pressed pawl capable of engaging selectively with one of a plurality of notches provided in a relatively fixed quadrant, the arrangement being such that upon the oscillation of the arm, movement will be imparted to the signalling arm of the device so that the latter may be raised and lowered to assume various positions capable of denoting various possible movements on the part of the vehicle, the said quadrant serving to maintain the signalling arm in any of its adjusted positions.

Other objects of the invention reside in the provision of a device of the above character which will include a novel mounting for connecting the same with the wind shield structure of a vehicle; in balancing the various parts of the signal so that the latter will be convenient and easy to manipulate; in the provision of means for eliminating rattle or looseness in the parts of the signal and in means for arresting and limiting sustained movements or positions of the signal.

For a further understanding of the invention, reference is to be had to the following description, and to the accompanying drawing, in which similar characters of reference denote like and corresponding parts throughout the several views thereof.

In said drawing:

Figure 1 is a fragmentary sectional perspective view of a portion of a motor vehicle and illustrating the application of the improved signal comprising the present invention thereto.

Figure 2 is an enlarged side elevation of the signal detached from the vehicle.

Figure 3 is a top plan view thereof.

Figure 4 is a sectional view taken along the line 4—4 of Figure 3, and,

Figure 5 is a detailed horizontal sectional view disclosing the signal when employed in connection with a closed car.

Referring more particularly to the details of the invention, the improved signal is designated in its entirety by the numeral 1, the same being adapted to be mounted in connection with the wind shield structure 2 of a motor vehicle 3, the said signal including generally a semaphore, a pivoted mounting 5 and an operating handle 6, the arrangement being such that the handle 6 will be located immediately adjacent to the steering wheel 7 of the vehicle, in order to be rendered easily accessible, the mounting 5 will be connected with or will pass through the frame of the structure 2, and the semaphore will be located exteriorly of the vehicle so as to be capable, upon the oscillation of the handle 6, of occupying various exposed and visible positions so as to be seen from positions to the front, rear and side of the vehicle.

The mounting 5 includes a metallic sleeve 8 which is capable of carrying a pair of separable clamps 9, which include angularly disposed overlapping ends 10 and inclined gripping edges or surfaces 11. The sleeve 8, at positions contiguous to the clamps 9, is threaded as at 12 to receive washers 13 and spaced binding nuts 14, the latter being located on opposite sides of the clamps 9, and so disposed that upon the tightening of the nuts, the said clamps will be forced together so as to be brought into holding relationship with the metallic frame 15 of the structure 2. Manifestly, this construction will result in rigidly supporting the sleeve 8 in stationary connection with the wind shield, and provides a construction which will be convenient to apply to vehicles formed to include open bodies.

Arranged to pass through the bore of the sleeve 8 is a rod 16, which has its inner end threaded as at 17 for the reception of binding nuts 18, which serve to connect the inner end of the rod with the operating crank handle 6 which is located near the steering wheel, the construction being such that upon the oscillation of the crank handle, movement will be imparted to the rod 16 to rotate the latter within the horizontal bearing provided by the sleeve 8. The outer portion of the rod 16 terminates in an angularly bent portion 19, which, in turn, is bent to produce an outwardly extending portion 20 constituting a part of the semaphore 4, the portion 20 being disposed substantially at right angles to that portion of the rod journaled within the sleeve 8. The outer end of the rod portion 20 is connected with a signalling blade 21, which may be of any suitable configuration and painted or otherwise decorated so as to be capable of attracting attention thereto. In this instance the blade 21 is provided with a centrally and longitudinally disposed groove 22, in which the portion 20 is seated and suitably secured. By this construction, the operation of the crank handle will result in effecting the oscillation of the semaphore, and the latter may be swung to assume in a selective manner any one of the four positions designated in Figure 1, and which positions conform with the accepted traffic laws governing vehicle signalling of this nature. Normally, the weight of the blade 21 and associated parts will tend to maintain the semaphore in a lowered or neutral position, the crank handle 6 being maintained in a vertically and upwardly extending position. By grasping the handle 6 and rotating the same downwardly a slight distance to the right, the semaphore may assume a position indicating that the vehicle will be stopped. Still further movement will cause the semaphore to extend horizontally and outwardly, indicating that a turn is to be made to the left, and when the semaphore is in an upwardly inclined position above the horizontal plane, the signal will indicate that the vehicle will negotiate a turn to the right.

In order to maintain the semaphore in these various adjusted positions, the handle 6 includes a pair of spaced plates, suitably secured together in separated relationship. These plates are adapted to receive between them a pivoted pawl 23, which includes a recess 24 capable of receiving the free extremity 25 of a flat leaf spring 26, the latter being so disposed as to provide a portion 27 which extends to one side of the handle and terminates in a portion 28 which is adapted to be suitably secured in any fixed manner to the handle. The portion 27 when grasped is adapted to be employed for the purpose of controlling the operation of the pawl 23. This pawl, by the action of the spring 26, is normally adapted to be forced into engagement with a fixed quadrant 29, which, in this instance, is rigidly carried by the inner end of the sleeve 8, the said quadrant having its periphery formed with a plurality of depressions 30, which correspond in number to the various positions which the semaphore will be caused to assume. It will be observed that the depressions 30 are of rounded undulating formation and correspond to the blunt nose formation of the pawl 23, a feature which permits the crank handle to be conveniently oscillated without incurring binding or undue stoppage thereof. The ends of the quadrant are formed to include offset stop fingers 31, which are disposed in the path of movement of the handle and operate to limit extreme movements thereof.

In view of the foregoing description, taken in conjunction with the accompanying drawing, it will be apparent that the present invention provides a signal which will be simple and convenient to apply, of practical construction, and involving but few and simple parts for the purpose of avoiding complications, expense and to insure continuous and positive operation. The arrangement of the parts of the signal is such that the handle may be conveniently operated with but slight trouble, in that the semaphore tends to balance the crank arm and to thus produce a construction which may be freely operated and retained in its several positions. The quadrant and the pawl construction serves to insure freedom of movement and yet to positively act so as to retain the semaphore in any of its set positions. Also, it will be observed that the spring 26 by reason of its formation will operate to permit of the release of the pawl from engagement with the quadrant whenever the handle 6 is grasped to operate the device. It will of course be understood that when the signal is employed in connection with a vehicle including a closed body, the clamps 9 may be omitted, and the sleeve may be caused to pass, as shown in Figure 5, through an opening provided in the frame of the body, and the nuts 14 may then be employed in their usual capacity for stationarily connecting the sleeve with the frame structure.

What is claimed is:

1. In a vehicle signal, a sleeve capable of being stationarily supported in connection with the wind shield structure of the vehicle, a notched quadrant connected with one end of the sleeve, an operating rod journaled within said sleeve, a crank handle connected with the inner end of said rod, a pawl carried by said handle and disposed for cooperation with the notches of said quadrant, and a signalling arm connected with the outer end of said rod and capable of operating in unison therewith upon the oscillation of said handle, said pawl and quadrant serving to maintain said arm in various positions of adjustment.

2. In a vehicle signal, a sleeve, means for stationarily connecting said sleeve in connection with the wind shield structure of a motor vehicle, an operating rod journaled for rotation within said sleeve, a signalling arm connected with the outer end of said rod, a crank handle connected with the inner end of said rod, a spring pressed pawl carried by said handle, and a stationarily mounted notched quadrant cooperative with said pawl and handle for maintaining said arm in various positions of adjustment.

3. In a vehicle signal, a sleeve disposed to extend longitudinally of a vehicle, threaded binding devices carried by said sleeve and cooperative with the latter to effect its stationary support in connection with the wind shield structure of the vehicle, an operating member rotatably supported by said sleeve, a signalling arm connected with the outer end of said member, a crank handle connected with the inner end of said member, a notched quadrant carried by the inner end of said sleeve, and a pawl pivotally carried by said crank handle and cooperative with said quadrant to maintain said arm in various positions of adjustment.

4. In a vehicle signal, a sleeve stationarily supported in connection with the wind shield of a vehicle, a rod journaled within said sleeve, a crank handle connected with the inner end of said rod, the outer portion of said rod being bent at an angle to the journaled portion and also curved to conform to the contour of the vehicle body, and means for maintaining said crank handle in various positions of adjustment to govern the signalling positions of said blade.

5. In a vehicle signal, a rod including a longitudinally extending portion journaled for rotation about its own axis, in connection with the wind shield structure of a vehicle, said rod being bent to include an outwardly and laterally extending portion disposed substantially at right angles to the portion thereof journaled in connection with the wind shield structure, a signalling blade secured to the outer end of the laterally extending portion of said rod, a crank handle formed with the inner end of the portion of said rod journaled in connection with the wind shield, and means for maintaining said crank handle in various set positions of adjustment.

6. In a vehicle signal, a stationarily mounted sleeve adapted to be rigidly carried by the wind shield structure of a motor vehicle, a shaft journaled for rotation within said sleeve, a signaling arm formed with the outer end of said shaft, a crank handle secured to the inner end of said shaft and adapted to effect the rotation of the latter upon manual manipulation, said crank handle including a pair of spaced plates, a notched quadrant projecting stationarily from said sleeve, and a spring pressed pawl pivotally disposed between said plates and cooperative with said quadrant to maintain said arm in various positions of adjustment.

7. In a vehicle signal, a sleeve stationarily connected with the wind shield structure of a vehicle, a shaft journaled within said sleeve, signalling arm formed with the outer end of said shaft and projecting laterally therefrom, a crank handle connected with the inner end of said shaft, a quadrant stationarily projecting from said sleeve and disposed contiguous to said handle, a pawl pivotally carried by said handle and adapted for engagement with notches provided in the periphery of said quadrant to maintain said handle in fixed positions of adjustment, and a leaf spring having a longitudinally extending portion thereof spaced from said handle and having the free end thereof disposed for engagement with said pawl to maintain the latter in engagement with the quadrant, the longitudinally extending portion of said spring serving to admit of simultaneous operation on the part of the handle and spring.

8. In a vehicle traffic signal, a sleeve stationarily supported in connection with a body of a vehicle and having a threaded end, threaded binding devices carried by the end of said sleeve and arranged for co-operation with a vehicle wind shield structure for retaining said sleeve stationarily in connection with said structure, a rotatable member positioned within said sleeve, an operating handle, threaded binding devices for uniting said member with said handle, and a signalling blade extending laterally from said member.

In testimony whereof I affix my signature.

ORVAL R. STRAWN.